United States Patent
Cummins et al.

(10) Patent No.: US 7,432,007 B2
(45) Date of Patent: *Oct. 7, 2008

(54) MOLDED FUEL CELL PLATES WITH SEALS

(75) Inventors: Dale T. Cummins, Paris, TN (US); David C. Alsip, Paris, TN (US); Joe B. Darke, Dover, TN (US); Jack A. C. Kummerow, Paris, TN (US)

(73) Assignee: Dana Automotive Systems Group LLC, Toledo, OH (US)

( * ) Notice: Subject to any disclaimer, the term of this patent is extended or adjusted under 35 U.S.C. 154(b) by 269 days.

This patent is subject to a terminal disclaimer.

(21) Appl. No.: 10/456,228

(22) Filed: Jun. 6, 2003

(65) Prior Publication Data

US 2004/0247981 A1    Dec. 9, 2004

Related U.S. Application Data

(63) Continuation-in-part of application No. 09/858,165, filed on May 15, 2001, now Pat. No. 6,599,653.

(51) Int. Cl.
*H01M 2/08*   (2006.01)
*H01M 8/04*   (2006.01)
*H01M 2/00*   (2006.01)
*H01M 2/02*   (2006.01)

(52) U.S. Cl. ............... 429/35; 429/36; 429/38; 429/39; 429/34; 29/623.2; 29/623.1

(58) Field of Classification Search ............ 429/35, 429/36, 38, 39, 34; 29/623.2, 623.1
See application file for complete search history.

(56) References Cited

U.S. PATENT DOCUMENTS

| | | | |
|---|---|---|---|
| 4,685,900 A * | 8/1987 | Honard et al. ............ 604/6.09 |
| 5,176,966 A * | 1/1993 | Epp et al. ............ 429/26 |
| 5,284,718 A * | 2/1994 | Chow et al. ............ 429/26 |
| 5,976,726 A * | 11/1999 | Wilkinson et al. ............ 429/35 |
| 6,057,054 A * | 5/2000 | Barton et al. ............ 429/42 |
| 6,231,053 B1 * | 5/2001 | Wakamatsu ............ 277/628 |
| 6,337,120 B1 * | 1/2002 | Sasaki et al. ............ 428/66.4 |
| 6,451,469 B1 * | 9/2002 | Nakamura et al. ............ 429/36 |
| 6,596,427 B1 * | 7/2003 | Wozniczka et al. ............ 429/32 |
| 6,599,653 B1 * | 7/2003 | Cummins et al. ............ 429/35 |
| 6,815,115 B2 * | 11/2004 | Sugita et al. ............ 429/35 |
| 2001/0019791 A1 * | 9/2001 | Gooch et al. ............ 429/36 |
| 2005/0244703 A1 * | 11/2005 | Osenar et al. ............ 429/35 |

* cited by examiner

*Primary Examiner*—Patrick Ryan
*Assistant Examiner*—Angela Martin
(74) *Attorney, Agent, or Firm*—Marshall & Melhron LLC

(57) ABSTRACT

A fuel cell unit incorporates a pair of plates; one plate an anode, the other a cathode. Respective anode and cathode plates are physically bonded together to form such pairs; wherein pluralities of the pairs are secured together to form commercially available fuel cells utilized to generate electric power. Seals employed between respective pairs of plates are in the nature of resilient beads arranged about selected areas of the plates to confine paths for fluids adapted to flow within said selected areas. A combination sealing and bonding method for manufacturing such fuel cell units involves the injection of a rapidly curable liquid silicone into aligned mold gating apertures of the respective pairs of the plates, whereby liquid silicone flows through and between the plates to a) seal between respective anode and cathode plates pairs and to b) form an insulation layer on the backside of the anode.

11 Claims, 2 Drawing Sheets

MOLDED FUEL CELL PLATES WITH SEALS

This application is a continuation-in-part of application Ser. No. 09/858,165 entitled "MOLDED FUEL CELL PLATES WITH SEALS" filed May 15, 2001 now U.S. Pat. No. 6,599,653, the disclosures of which is incorporated herein in its entirety by reference.

BACKGROUND OF THE INVENTION

1. Field of Invention

The present invention relates to improved fuel cell assemblies for generating electric power, and more particularly to a method for providing combined sealing media between individual fuel cell plates and insulation between fuel cell units, all in a single process.

2. Description of the Prior Art

It is known to apply resilient sealing beads to and between the faces of fuel cell plates for controlling fluid flows between pluralities of such plates, stacked in pairs and bolted together for generating electric power. In a typical fuel cell stack arrangement, the pluralities of such plates are sandwiched together in a parallel, face-to-face pattern. The plates are held spaced apart by resilient sealing beads typically adhesively bonded to the face of at least one of any two adjoining plates. The sealing beads fit within grooves on the faces of the plates, and define paths or channels for fluids to flow between the plates. Normally, the fluids include not only fluid electrolytes used for generation of energy, but also coolants as will be appreciated by those skilled in the art.

The cell plates employed in the usual fuel cell are normally formed of plastic composites that include graphite. The sealing beads are formed of an elastomeric material. The beads are normally adhesively applied to the plates by a bonding agent, although in some cases the beads are simply held in place by pressure of compression created by bolted connections between plates. Each fuel cell unit is comprised of a cathode and an anode plate. Between each cathode and anode plate of each cell flows a coolant material of either a glycol-based anti-freeze or deionized water. Between each cell unit flows two chemically reactive elements, hydrogen and oxygen, separated by a catalytic membrane. The hydrogen and oxygen elements react at the membrane to form water vapor in a type of reverse electrolysis.

The nature of the chemical reaction, along with a need for separation of the coolant from the reacting elements, occasionally requires that extreme or costly measures be taken to avoid leakage through or between the plates. Thus, an improved mechanism is needed to assure against leakage between adjacent fuel cell plates, one that is highly reliable, particularly in mass production manufacturing environments.

SUMMARY OF THE INVENTION

A fuel cell apparatus includes a plurality of individual fuel cell units, each including at least two facing, parallel plates, mated together. A resilient sealing media, preferably formed of an elastomeric material, is employed to seal the plates together. The sealing media may be applied in the form of a curable fluid sealing material, which after being cured in place, is adapted to facilitate control of fluid flows, such as coolants between the plates, and of electrolyte flows between fuel cells. Upon completion of manufacture, a plurality of such parallel, stacked plates that incorporate the present invention are separated by a plurality of discrete resilient sealing beads disposed over selective portions of the surfaces of the two facing plates.

Specifically, the invention involves the manufacture of fuel cell units, each unit defined by a pair of plates comprising an anode and a cathode plate, in which the cathode plate and the anode plate are sealingly bonded together. Pluralities of such fuel cell units are stacked and secured together to form commercially available composite fuel cell structures utilized to generate electric power, either domestically (i.e. for home use) or for use in vehicles.

The invention offers a combination sealing and insulation procedure in which pairs of such fuel cell plates may be manufactured in a simple and efficient manner. The method employed involves the injection of a rapidly curable liquid silicone into an aligned mold aperture of one of the mated plates, whereby liquid silicone may flow via the apertures through the other plate, as well as between the plates in order to establish a seal between cathode and anode plates. Moreover, the liquid silicone is injected into aligned mold gating apertures of the cathode and anode plates, flows entirely through both plates, and forms an insulation layer on the backside of the bottom plate. In the preferred embodiment described herein, the bottom plate is the anode.

DETAILED DESCRIPTION OF THE PREFERRED EMBODIMENTS

Figure 1:
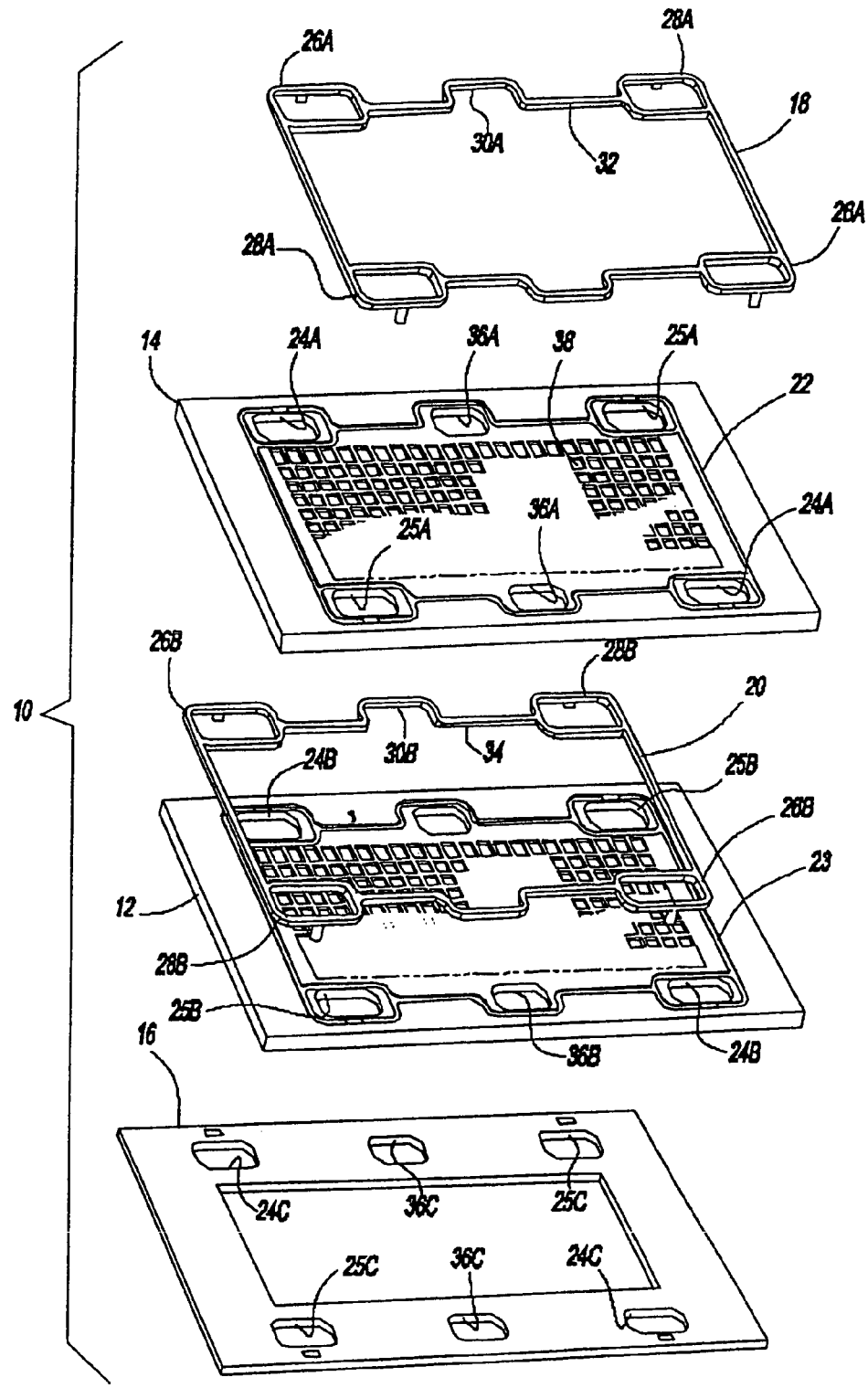
FIG. 1 is an exploded view of a fuel cell unit of the type described in the present invention, including anode and cathode plates along with seals adapted for interposition between plates within grooves on the plate faces, and including an insulation layer on the backside of the anode.
Figure 2:
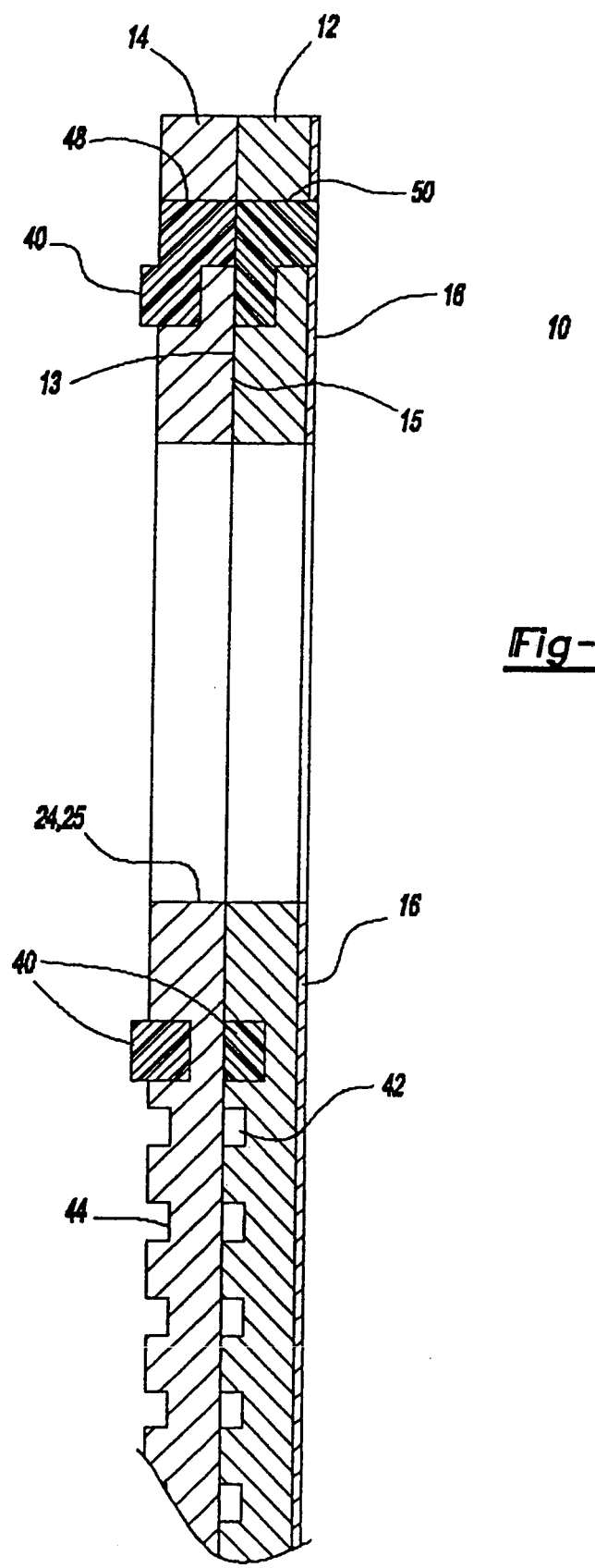
FIG. 2 is a fragmentary cross-sectional view of an assembled molded and sealed fuel cell unit of FIG. 1, taken through a corner of an assembled rectangular unit constructed in accordance with the present invention.

Referring to FIGS. 1 and 2, a fuel cell unit 10 is shown, which includes an anode plate 12 and a cathode plate 14. Stacks of such fuel cell units 10 are assembled together to provide composite fuel cell structures (not shown) to generate electric power. In such a stack, an insulation layer 16 is interposed between each fuel cell unit 10.

Elastomeric sealing beads 18, 20 are interposed between each fuel cell unit 10, as well as between each plate 12, 14. Although the beads 18, 20 are shown separately in the exploded depiction of FIG. 1, this invention provides a means by which the beads will be integrally connected in one single, contiguous mass of material as will be explained herein. In preferred form, the layer 16 is thicker than the beads 18, 20.

Each of the sealing beads 18, 20 is accommodated by respective grooves 22 in the cathode plate 14, and grooves 23 in the anode plate 12. The sealing beads 18, 20 are contiguous so as to define interior perimeters 32 and 34, respectively, adapted to accommodate either a coolant or a fuel component. Thus, fuel apertures 24 accommodate the admission and flow of liquid hydrogen into the plate reaction area 38 of the anode 12. Referring specifically to FIG. 2, the anode includes grooves 46 for this purpose. Conversely, the cathode 14 includes a series of grooves 44 which provide a reaction media for oxygen, which is admitted into the area 38 via fuel apertures 25.

Within the respective plates 12 and 14, the fuel apertures are shown as 25A and 25B, and 24A and 24B, respectively, as shown. In the structures of the unitary sealing beads 18 and 20, fuel apertures for hydrogen are shown as fully circumferential apertures 26A and 26B, while fuel apertures for oxygen are depicted as fully circumferential apertures 28A and 28B. It will be noted that the respective oxygen and hydrogen apertures accommodate a cross flow over the plate reaction area 38, to the extent that the apertures are diametrically opposed from each other within the rectangular plates 14 and 12.

It will be appreciated by those skilled in the art that chemical reactions in the nature of a reverse electrolysis takes place within a fuel cell. The reactions are created by the contact between the fuel components of oxygen and hydrogen, and enhanced by a catalytic membrane (not shown) positioned between adjacent stacked fuel cell units 10. Thus, such reactions take place only between the fuel cell units 10. Referring now particularly to FIG. 2, spaced areas between each of the mating, parallel faces 13 and 15 of each of the pairs of anodes 12 and cathodes 14, respectively, are defined by inter-plate coolant grooves 42. Primary fuel cell cooling thus takes place between each of the mated plates 12 and 14 of each fuel cell unit 10.

Referring now particularly to FIG. 1, coolant ports 36 admit deionized water into the coolant grooves 42 between the plates 12 and 14. The ports 36 are shown respectively as 36A and 36B in the plates 14 and 12, and as 36C in the mated insulation layer 16. In the preferred embodiment detailed herein, the coolant ports are arranged to be medially located within the plates and across from each other for optimal benefit, as those skilled in the art will fully appreciate. For this purpose, it will be noted that the sealing beads 18 and 20 contain portions 30A and 30B designed as semi-circles to promote flows of coolant within their contiguous interior perimeter boundaries 32 and 34, respectively.

A method of manufacturing the fuel cell unit 10 of the present invention can be described as follows. Referring specifically to FIG. 2, it will be noted that the respective sealing beads 18 and 20, as well as the insulation layer 16, are all formed as a unitary, contiguous mass of material 40. This approach avoids the need to form separate insulation and sealing bead parts of FIG. 1, and thus reduces costs of manufacture. As earlier noted, the beads and insulation layer are preferably formed of an elastomeric material. For this purpose, a liquid silicone material may be injected under pressure through aligned gating apertures 48 and 50, which pass respectively through the anode 12 and the cathode 14, as shown in FIG. 2.

A preferred range of manufacturing pressure is 300 to 700 pounds per square inch at a temperature in the range of 300 to 400 degrees Fahrenheit. The respective anode and cathode plates are placed on the floor of a mold (not shown) with the anode positioned face down, but spaced from, said floor. Liquid silicone is then forced through the gating apertures, 48 and 50, initially through the cathode, at the noted pressures which are sufficient to force the sealing media through and between the plates, and including the space between the bottom plate (anode) and the bottom or floor of the mold. The liquid silicone material, at the relatively high temperatures noted, will cure within a span of approximately two minutes.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. An electrolytic fuel cell, comprising:
   two plates having opposing surfaces generally facing one another, each of said plates having at least one aperture wherein said apertures of opposing plates are generally aligned when said plates are facing one another; and
   a unitary, contiguous, resilient media that substantially fills said at least one aperture and which forms a bead extending entirely about a periphery of at least one of said plates, said resilient media having first and second regions, said first region sealingly disposed between portions of said plates, said second region sealingly disposed about a non-facing side of one of said plates, a portion of said second region completing part of said bead;
   wherein said second region entirely surrounds a channel, said channel extending between said plates such that a liquid can pass between said plates, said first region extending from said portion of said second region that completes part of said bead through one of said plates to the other of said plates adjacent said channel while said second region does not extend through either of said plates.

2. The electrolytic fuel cell as claimed in claim 1 wherein said second region of said resilient media has a thickness greater than the thickness of said first region.

3. The electrolytic fuel cell as claimed in claim 1 wherein said second region of said resilient sealing media is an insulation layer.

4. The electrolytic fuel cell as claimed in claim 1 wherein each of said at least one apertures are further adapted for communicating said resilient material such that said media may be communicated therethrough.

5. The electrolytic fuel cell as claimed in claim 4 wherein said resilient sealing media is pressurably directed into said apertures to form both said first and second regions.

6. The electrolytic fuel cell as claimed in claim 1 wherein said resilient media is formed of a silicone material.

7. A method of making an electrolytic fuel cell unit in a mold, the electrolytic fuel cell unit having a pair of fuel cell plates each having at least one aperture, and a unitary, contiguous, resilient media sealingly disposed therebetween and thereunder said method comprising the steps of:
   aligning said pair of fuel cell plates in proximity with one another such that each of said at least one apertures are generally aligned; and
   pressurably communicating said resilient media through each of said at least one apertures such that said media substantially fills each of said at least one apertures, said media forming a bead extending entirely about a periphery of at least one of said plates and is disposed between said plates and a space between the bottom plate and a floor of the mold, said media further surrounding a liquid transmitting channel that extends between said plates, said media surrounding said channel disposed about a non-facing side of one of said plates;
   wherein said media in said aperture extends from one plate to the other plate only where a portion of said media forms an outer peripheral wall about said channel, said wall comprising a portion of said periphery about said at least one plate.

8. The method for making an electrolytic fuel cell unit as claimed in claim 7 wherein said sealing media is a silicone material.

9. The method for making an electrolytic fuel cell unit as claimed in claim 7 further comprising the step of permitting said media to cure.

10. The method for making an electrolytic fuel cell unit as claimed in claim 7 wherein said pressure is substantially between about 300 and 700 pounds per square inch.

11. The method for making an electrolytic fuel cell unit as claimed in claim 7 wherein a temperature is substantially between about 300 and 400 degrees Fahrenheit.

* * * * *